S. R. Sylvester,

Soda-Water Apparatus,

No. 2,033. Reissued July 18, 1865.

Witnesses:
Joseph F. Hodgson
James Handley

Inventor:
S. R. Sylvester

N. PETERS, PHOTO-LITHOGRAPHER, WASHINGTON, D. C.

UNITED STATES PATENT OFFICE.

SAMUEL R. SYLVESTER, OF WASHINGTON, DISTRICT OF COLUMBIA.

IMPROVEMENT IN SODA-FOUNTAINS.

Specification forming part of Letters Patent No. 39,331, dated July 21, 1863; Reissue No. 2,033, dated July 18, 1865.

*To all whom it may concern:*

Be it known that I, SAMUEL R. SYLVESTER, of the city of Washington, District of Columbia, have invented a new and useful apparatus for serving soda-water on draft, which I term an Improved Soda-Water Fountain; and I do hereby declare that the following is a full, clear, and exact description thereof, reference being had to the following drawings, making a part of this specification, in which—

Figure 1:
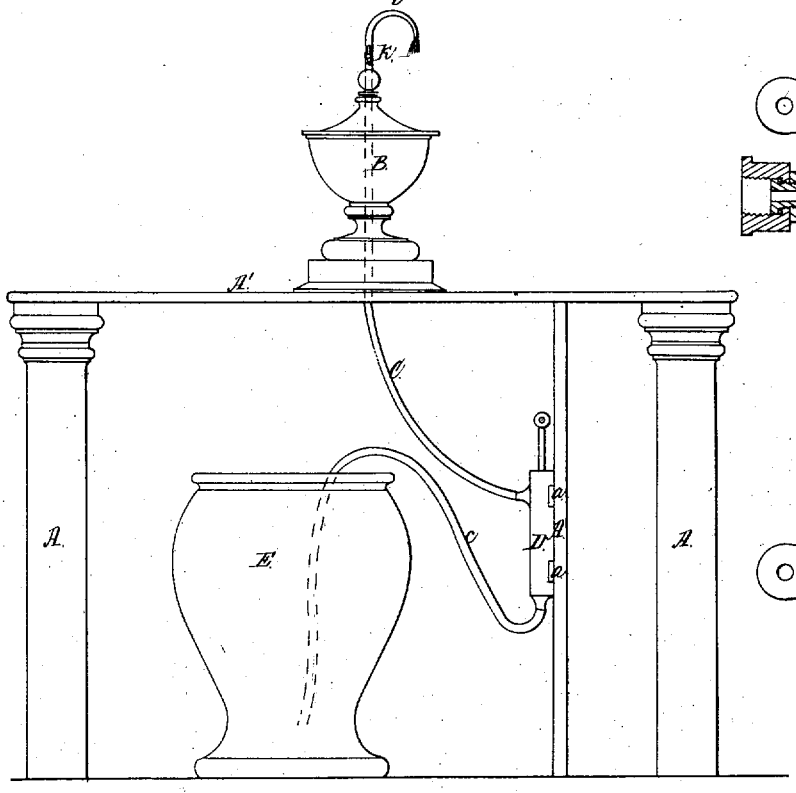
Figure 2:
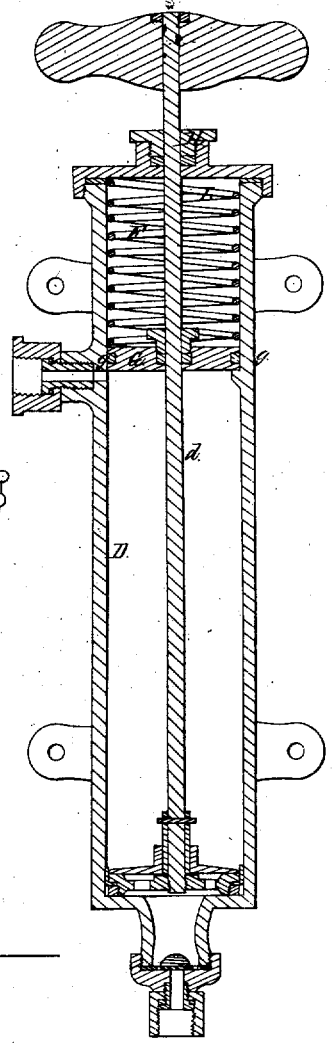

Figure 1 is an elevation of the apparatus arranged for use. Fig. 2 is an enlarged vertical section through a pump, which may be used when a continuous stream is required from the draw-pipe.

Similar letters of reference indicate corresponding parts in both figures.

The object of this invention is to furnish soda-water on draft by passing a solution of the supercarbonate of soda from an open vessel through a pump, and bringing this solution in violent contact with an acidulated sirup, so as to mix the alkaline and acid solutions thoroughly together, and thus produce a pleasant effervescing draft or beverage.

Soda-water, or a mixture of supercarbonate of soda and acidulated liquid, has been furnished on draft before my invention by mixing the acid and alkaline solutions on their passage to the fountain or draw-pipe, but this has been found objectionable for various reasons, chiefly because there is not a perfect mixing of the solutions and neutralizing of the compounds therein, and also because the effervescing of the liquids ceases, and they become dead when the mixture stands in the pipes or fountain for a short time exposed to the atmosphere.

Other apparatuses which have been used for this purpose before my invention have the soda-water confined in tight vessels under pressure of gas or air, which pressure forces the solution out of the vessel when the draw-pipe is opened.

I desire to dispense with the use of air-tight reservoirs and the mixing of the alkaline and acid solutions in such reservoirs, and to draw the alkaline solution from an open vessel, or one which is not air-tight, and force this solution through a pump of a suitable description, directly into a drinking-vessel containing an acidulated sirup with considerable violence, so that it will not be afterward necessary to stir the solutions in said vessel to mix the ingredients and neutralize them.

In order to make a pleasant beverage of the solution of supercarbonate of soda and acidulated sirup, and to deprive the solutions when mixed of all alkaline taste, it is important to combine the same in such proportions that the acid will completely neutralize the alkali. This can be done with more accuracy and with less trouble by keeping the solutions separate until they are brought together in the drinking-vessel.

To enable others skilled in the art to understand my invention, I will describe its construction and operation.

In the accompanying drawings, A represents a counter or table, upon which is an urn or any other suitable ornament, through which the discharge-pipe C passes, as shown in Fig. 1. This pipe C projects from the urn B, and is suitably curved, so that it will discharge liquid into a drinking-vessel held under its end, the cock *k* being used to open the pipe during the act of drawing liquid, after which this pipe can be closed. The lower end of pipe C leads into a pump-barrel, D, which is secured rigidly to the counter A in a convenient position to a person standing at the counter. A piston is arranged in the barrel D, having a valve, which opens upward therein, and a rod, *d*, provided with a handle on its upper end. This piston-rod passes through a stuffing-box, H, in the cap of the pump, and also through a follower or piston, G, which is arranged in the upper end of the pump, above the discharge-opening leading into pipe C. Above the piston G is a chamber, F, containing a helical spring, I, which, by its recoil, tends to keep the piston G down upon the shoulder-supports *g g*, as shown in Fig. 2. The piston G is suitably packed around its circumference, so as to prevent any liquid from being forced up into the chamber E. A valve is arranged in the lower end of the barrel D, which opens upward and serves to prevent any liquid which is drawn above it from returning again as the piston descends.

The object of employing the piston G is merely to obtain a continuous stream from the pump, and where a continuous stream is not required or deemed important this piston G may be dispensed with, leaving a common lifting-pump for elevating the liquid and forcing it through the discharge-pipe. Any well-known pump may be employed which may be found to answer the purpose, whether it be a force-pump or a single-acting lifting-pump.

The pump D communicates with an open reservoir, E, by means of a pipe, *c*, which is conducted nearly to the bottom of said reservoir. It is important that this reservoir be open to the admission of air into it to supply the place of the water which is removed therefrom by the pump. It may be covered, but it should not be air-tight, for in this case liquid could not be drawn out of it by the pump. It is also desirable to have this reservoir open for the purpose of cleaning it out readily and refilling it with the supercarbonate-of-soda solution. This reservoir is located beneath the table A, where it will be convenient to get at, but it may be placed in a cellar or in any other place where it will be convenient to clean and refill it when required.

This apparatus is charged by simply pouring a solution of supercarbonate of soda into the reservoir E and filling the pump D and pipe C. To draw the liquid from the pipe C the piston-rod *d* is depressed and then drawn up again with rapidity, which will force the liquid violently from the nozzle of the discharge-pipe into a vessel, which should be placed beneath it. By thus forcing the liquid into a vessel containing an acidulated sirup this sirup is suddenly mixed with the alkaline solution and a complete neutralizing of the alkali is the result, producing more perfectly than hitherto the well-known effervescing draft soda-water.

It will be seen from the above description of my invention that I do not limit myself to any particular form or construction of pump. I may employ a pump which will give a uniform stream, or a pump which will give an intermittent stream. The former is, however, preferable for some purposes, but it requires more manual labor to operate it than the single-acting pump.

It is important to have the pump so arranged that the liquid will pass directly through it and thence through the discharge-pipe C every time the pump is operated; also, to locate the pump in such relation to the nozzle of the draw-pipe that a person can conveniently operate the pump and handle the drinking-glasses upon the table A at the same time.

By my invention it will not be necessary to employ an air-tight vessel to contain the alkaline solution, nor to mix this solution in the apparatus before it is discharged. The force which may be necessary to raise and discharge the soda-water is applied and regulated by the person drawing the same, and is not dependent upon the elastic pressure of confined air as in apparatus of this class hitherto invented, nor upon a body of air acted upon by the pump, and in turn itself acting upon the solution of soda within the reservoir.

My object is to furnish a cheap, durable, and portable soda-water fountain consisting of a pump, an induction-pipe, and an open reservoir, or a reservoir which is not air-tight, such an apparatus being very easily operated and avoiding the great labor which is expended in charging the air-tight chamber of other apparatuses.

Having thus described my invention, what I claim as new, and desire to secure by Letters Patent, is—

1. Producing soda-water on draft by means of an apparatus which is so constructed as to give a direct discharge of the alka-line solution from an open vessel through a pump into a vessel containing an acidulated sirup, substantially as described.

2. Producing a continuous or uninterrupted stream of an alkaline solution from an open vessel into a vessel of acidulated sirup by means of a pump constructed substantially as described.

S. R. SYLVESTER.

Witnesses:
JOHN B. WHEELER,
JAMES HANDLEY.